Jan. 17, 1967   H. V. ERICKSON   3,298,406
CHAIN SAW CHAIN
Filed May 15, 1964
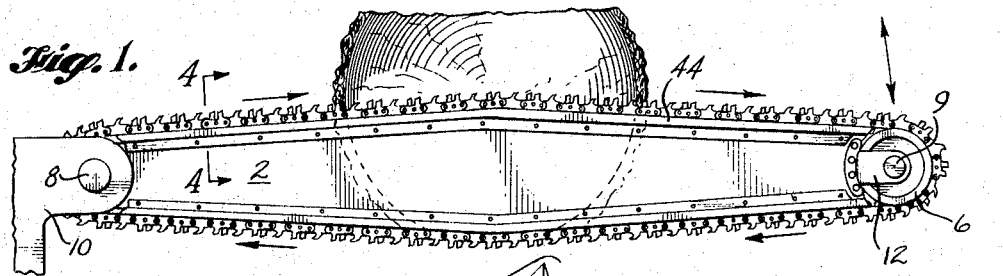
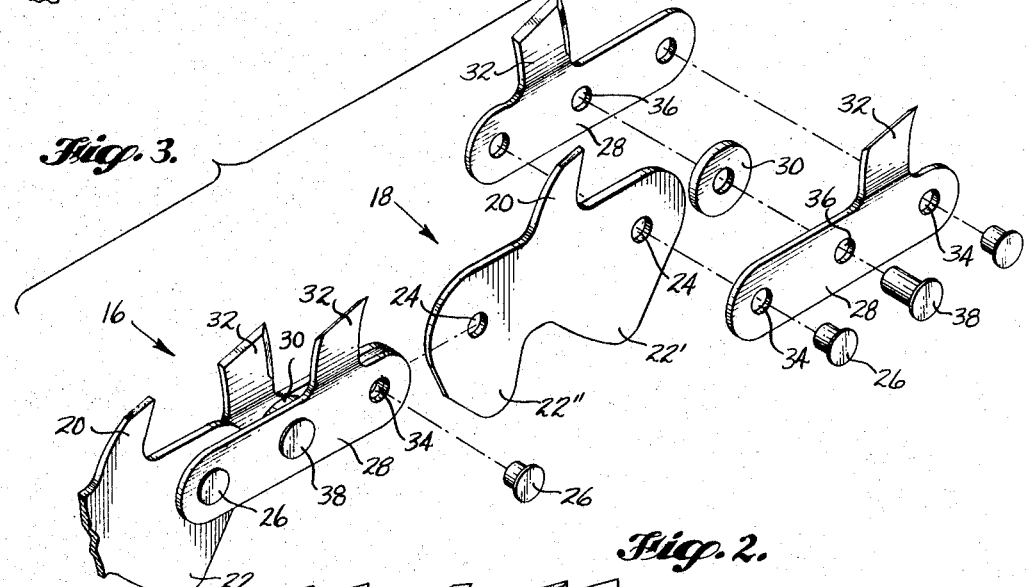
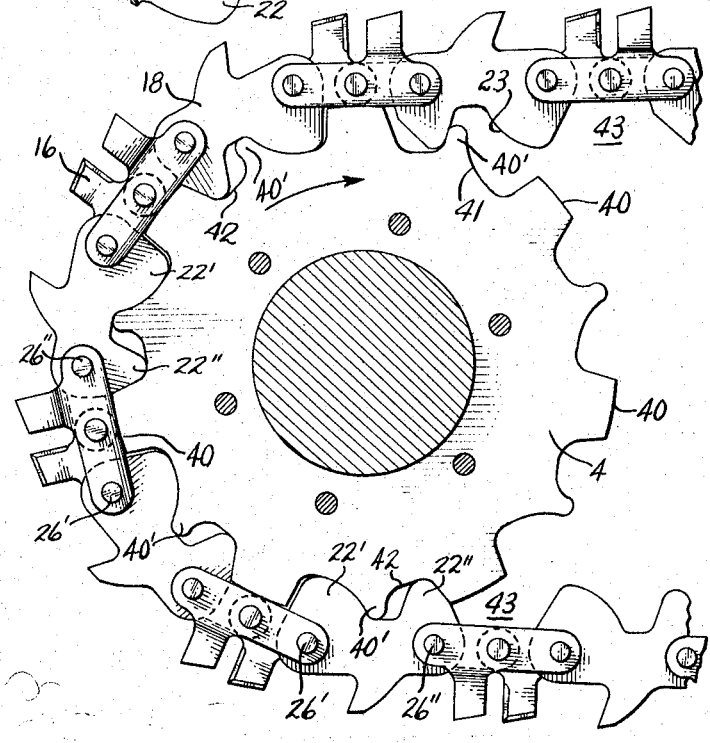
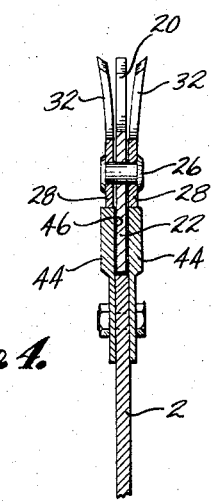
INVENTOR.
HERB V. ERICKSON
BY Reynolds and Christensen
ATTORNEYS

United States Patent Office 3,298,406
Patented Jan. 17, 1967

3,298,406
CHAIN SAW CHAIN
Herbert V. Erickson, 1219 S. Fife,
Tacoma, Wash. 98405
Filed May 15, 1964, Ser. No. 367,800
5 Claims. (Cl. 143—32)

This invention relates to chain saws and more particularly to a new and improved combination of a drive sprocket and an endless cutter chain for such saws.

The cutter chain used on conventional chain saws today takes the form of a series of alternate cutter and raker links which are successively articulated about rivets in a closed prolate loop. The links are equipped with teeth, certain of which depend from the links inwardly of the chain, to be received in the recesses of a sprocket acting to drive the chain; and others of which are upstanding from the links, outwardly of the chain, to perform the tasks of making the cut, and clearing the cut of severed material. The teeth depending from the links are commonly called the "drive" teeth and those upstanding from them, the "cutter" and "raker" teeth, respectivey, in accord with their tasks. I shall also use these terms in referring to the various teeth hereafter.

In use, the cutter chain is mounted about the length of an elongated guide bar which is of general plate form and has the drive sprocket at one of its ends, and a free turning grooved pulley at the other. The guide bar is also equipped with rails or reinforcing strips along its longitudinal edges which outlie the edges so that peripheral channels are formed between the rails to receive and act as guideways for the drive teeth on the chain; there being sufficient ellipticity to the bar with respect to the sprocket and pulley, and sufficient size to the drive teeth in relation to the channels, that the teeth are slidably engaged in the channels throughout the length of the latter to stabilize the chain in the lateral direction.

Paradoxically, the longevity of a chain of this type is measured more by the life of the link bodies than by the wear of the cutter and raker teeth. In fact, often long prior to the time the latter teeth are worn beyond the point of resharpening, a link will fail across some point in its body or will reach a dangerously thin condition. Some have attributed this to the abrasive action of grit and other foreign matter which gets between the side faces of the links and the rails in the channels. Others have attributed it to the continual fatiguing of the links at the high temperatures of rubbing metal surfaces. Still others have advanced slightly different causes.

I have studied the problem and have arrived at a separate and entirely distinct cause, and have devised a solution for it, both of which I shall now describe.

Firstly, I have observed that rupture of the links most often occurs at one of their apertured ends where they are pivotally connected by the rivets to the adjoining links. I have also observed that this is due not so much to thermal fatigue or to attrition at the hands of grit and the like, but to a shearing action which occurs across one or both ends of the link due, I find, to the continual wrenching, twisting, or "whiplashing" that the links undergo as they traverse the length of the channels.

The conditions giving rise to this action are not limited to chains that have seen much use. As use of a chain progresses, it is true that the accumulated wear in the drive teeth, or in the channel rails, increases the lateral play that is permitted between the links and the channels. This play is undoubtedly quite damaging to the links at the weakest point in their bodies adjacent the rivet apertures. However, I have also found that even initially, when first placed in use, most chains known today are subjected to a large measure of this same "whiplashing" action due to the very nature of their construction.

Consider the conventional chain of today. Its cutter and raker links are each equipped with a single drive tooth (or with none at all) which is arranged generally below a median point in the body of the link, between the rivets serving to join it with the adjacent links. The purpose of this construction is to provide a pivotal point between each pair of drive teeth and to place the recesses opposite these pivotal points, in order that the links may "roll" one by one over the sprocket teeth as articulation occurs between them.

Now consider what occurs as the drive teeth traverse the length of the channels on the guide bar. Due to their manner of engagement, the drive teeth must knock or strike against the rails from time to time in their passage. Each such collision gives rise to a lateral force across the colliding link or links. The rivets joining each such link to adjacent links are free of such force since they lie outside the channels. Consequently, the force has the effect of wrenching the link about normals to the rivets. The continual wrenching and whiplashing of the link against the sides of the rivets eventually causes either an end section of the link or the adjacent rivet to rupture. Of course, such a result renders the saw inoperative until the defective link or links are replaced.

I have devised a solution to this problem which I find virtually eliminates its cause. According to my invention, I have observed that if a link is given two drive teeth, that is, one for each rivet, then a drive tooth can be aligned with each rivet, upright of the link, and the space between the rivets can be occupied by a recessed portion of the link which lies for the most part outside of the channels. The advantages of this are two-fold. Since each rivet is carried directly above a tooth, any lateral force arising in its tooth acts generally coaxially of the rivet, and there is little, if any, moment generated about it. There is a moment generated about the other, more forward or rearward rivet, but this is offset by the fact that the tooth underlying it can absorb the moment through its engagement in the channel below. No moment can be generated about either rivet at a point intermediate the two, since the body of material between the rivet apertures lies substantially outside the channels and cannot collide with the rails. The overall result is that the link is able to absorb any such force in its drive teeth without adverse effect to its superstructure. In turn, the chain as a whole is more stable, and the life of the chain becomes only a matter of how long its cutter and raker teeth can be resharpened.

The presence of two drive teeth on a link requires adapting the links otherwise to their driven relationship with the sprocket. Toward this end, I have found that it is best to remove the drive teeth altogether from every other link so that in my preferred chain construction, the double teeth links are interspaced by links without drive teeth. The latter may be the cutter links or they may be the raker links, with the remaining form of link having the double drive teeth in either case. Preferably, the raker links are equipped with the double teeth.

I have also devised certain other features with respect to the construction of the chain and the sprocket, but I shall reserve these for discussion in connection with the detailed description I give hereafter of the preferred form of my invention. The added advantages these confer will also be discussed at that time.

It should be evident at this point that the principal object of my invention is to eliminate the cause or causes of wear and failure of the links in a cutter chain of the nature described. Other objects include increasing the rigidity and stability of such a chain, and improving on costs and the ease of manufacture and repair of such chains. I also want to make repair faster, less frequent, and in general prolong the working life of such chains. Still other objects will arise from my detailed description.

Reference should be made to the accompanying drawing for this description, wherein:

FIGURE 1 is a view in perspective of the guide bar and cutter chain of a heavy duty chain saw such as is used in lumber mills for cutting large logs;

FIGURE 2 is an enlarged part-sectional view of the bar's drive sprocket and the adjacent end section of the chain, both of which incorporate features of my invention;

FIGURE 3 is a partly exploded view of a segment of the chain; and

FIGURE 4 is a cross-sectional view along the line 4—4 of FIGURE 1.

The guide bar is essentially an elongated plate 2 which is somewhat elliptical in the crosswise direction so that its center section has an increased span over that of its end sections. The ends of the plate are shaped to accommodate a drive sprocket 4 at one end and a grooved pulley 6 at the other. The sprocket and pulley are mounted in tandem with the plate on shafts 8 and 9, respectively, which are supported in turn in bracket mounts 10 and 12, the left-hand of which 10 extends from a motor unit (not shown) for powering the sprocket. The sprocket is driven through its shaft 8 by gearing or other conventional means, and is secured by pins 14 to a collar (not shown) on the shaft for this purpose. The pulley is free to turn on its shaft as is conventional.

Referring in particular to FIGURES 2 and 3, note that the cutter chain is comprised of alternate cutter and raker links, the former being marked generally as 16 and the latter as 18. Each raker link is stamped from a sheet of metal so as to have a raker tooth 20 standing up from its center section, and a pair of drive teeth 22 depending from its end sections. The end sections are apertured at 24 to receive rivets 26 which serve to interconnect the raker link with the adjacent cutter links as seen. The latter are each comprised of an assembly of three stamped parts, namely a pair of cutter bits 28 and a washer 30. The cutter bits have cutter teeth 32 standing up from similar locations on their end sections, but are reversed in the assembly so as to place the cutter teeth at alternate locations along the length of the link. The end sections are apertured at 34 to receive the rivets 26 joining the link with the adjacent raker links. The center section is also apertured at 36 to carry a binder rivet 38 which is employed in assembling the link.

The assembly of each cutter link is accomplished, as seen, by inserting the washer 30 between the center section of the cutter bits and passing the binder rivet 38 through, first, one aperture 34, then the washer, and then the other aperture 34. The raker links and cutter links are then joined in similar fashion, using the end sections of the raker links as spacers between the end sections of the cutter bits for the rivets 26.

The drive teeth 40 on the sprocket and the drive teeth 22 on the raker links are cooperatively sized, shaped, and filleted to transfer the driving force of the sprocket into the raker links between the points at which the chain is reeled onto and unreeled from the sprocket. Toward this end, note (FIGURE 2) that the pitch interval between the teeth 22 on each raker link 18 is less than the pitch interval between successive teeth 22 on adjacent links 18. Note also that the forward teeth 22′ on the raker links have arcuate faces 23 on one side thereof which are swung from centers substantially coincident with the rivets 26 aligned therewith; and that the sprocket recesses 41 receiving these teeth are correspondingly contoured to provide for surface-to-surface contact between the teeth and the recesses as the chain rounds the sprocket. In addition, the remaining recesses 42 in the sprocket are angularly enlarged in relation to the angular width of the drive teeth 22″ received therein so that the latter teeth and recesses can smoothly engage and disengage with and from one another notwithstanding that there is no pivotal connection between any of the drive teeth.

The sprocket teeth 40 received in the recesses 43 between the raker links are transversely truncated to carry the bodies of the cutter links thereon.

It is, of course, this double-toothed construction, in which the teeth 22 are joined by a rigid body, which gives my cutter chain its stability. Returning to FIGURE 1, note that the upper and lower longitudinal edges of the guide bar are each equipped with a pair of rails 44 which, as better seen in FIGURE 4, are riveted to the respective edge so as to outlie the same and form a channel 46 running the length of the edge at tangents to the sprocket and pulley. The teeth 22 ride or track in this channel so as to be guided by the rails. Should one or both bump or knock up against a rail, the lateral force acting on the raker link is absorbed in the teeth 22 with little or no strain on the material surrounding the apertures 24, or on the rivets 26. Assuming, for example, that the forward tooth 22′ suffers such a blow, the force will have little moment about the rivet 26′ above it since the rivet is in substantial alignment with the tooth in the upright direction. On the other hand, the force's moment about the rearward rivet 26″ is absorbed in large part by the countereffect of the rails on the rearward tooth 22″ and the fact that the waisted center portion of the raker link contains a generous amount of material through which the force of the blow must wrench its way before reaching the rivet 26″.

One will also note the savings in material and labor in the manufacture of my chains. No longer is a fourth stamping necessary to provide a toothed shim for the cutter links. Ordinary stock washers can be used, as illustrated, for the shim or spacer between the cutter bits. Note also that the number of rivets has been reduced from that needed in prior constructions, particularly with respect to the assembly of the cutter bits. The cutter bits can, in fact, be permanently joined by welding or other such means, if desired, so as to reduce the necessity for riveting to a further extent. Repair of one of my chains is a simple matter of removing the two rivets 26 interconnecting the links, and replacing the defective link, the individual cutter links remaining intact in all events through the binder rivets 38, welding, or whatever other such means is chosen. Repair is seldom needed, however, due to the low wear factor in both the chain and the guide channels, as aforedescribed.

My chain and sprocket combinations are intended for use principally in large cross-cut saws of, say, 8 feet or more, as employed in lumber mills. It is evident, however, that they will find equal application in chain saws of any size down to the smallest home-owner model.

It should also be evident that many modifications and additions can be made in and to my invention without departing from the spirit and scope of the invention as defined in the following claims.

I claim as my invention:

1. The combination of a sprocket having drive teeth on the periphery thereof and an endless sprocket chain which is guided and engaged in a closed prolate loop about the sprocket, said chain being comprised of successively pivotally interconnected links, alternate links of which have pairs of drive teeth depending from the bodies thereof which are in substantially upright alignment with the pivot points in the links and individually operatively interposed in the recesses between successive drive teeth on the periphery of the sprocket, the sprocket teeth being interposed, in turn, alternately in (1) the recesses between the pairs of drive teeth on the alternate links and (2) the recesses between adjacent drive teeth on adjacent alternate links, opposite the bodies of the remaining links in the chain; the pitch interval between the drive teeth on each alternate link being less than the pitch interval between adjacent drive teeth of adjacent alternate links, and the drive teeth in corresponding positions on the alternate links having arcuate faces on one side thereof which are swung from centers substantially coincident with the pivot points aligned therewith, with the sprocket recesses receiving said link drive teeth being correspondingly contoured to provide for surface to surface contact between the teeth and the recesses, between the points at which the chain is reeled onto and unreeled from the sprocket, and the remaining sprocket recesses being angularly enlarged in relation to the angular width of the remaining drive teeth of the alternate links which are received therein so that the latter drive teeth and recesses can smoothly engage and disengage with and from one another at the points in which the chain is reeled onto and unreeled from the sprocket.

2. The combination according to claim 1 wherein the sprocket teeth received in the second-described recesses are transversely truncated to carry the bodies of the remaining links thereon.

3. In a chain saw, the combination of a guide bar with a drive sprocket having drive teeth on the periphery thereof journaled on one end portion thereof, and an endless cutter chain which is engaged about the sprocket and guided in a closed prolate loop extending up and down the length of the bar, said chain being comprised of successively pivotally interconnected links which are alternately adapted as cutter and raker links for the saw, the raker links of which have pairs of drive teeth depending from the bodies thereof which are in substantially upright alignment with the pivot points in the links and individually operatively interposed in the recesses between successive drive teeth on the periphery of the sprocket, the sprocket teeth being interposed, in turn, alternately in (1) the recesses between the pairs of drive teeth on the raker links and (2) the recesses between adjacent drive teeth on adjacent raker links, opposite the bodies of the cutter links in the chain; the pitch interval between the drive teeth on each raker link being less than the pitch interval between adjacent drive teeth of adjacent raker links, and the drive teeth in corresponding positions on the raker links having arcuate faces on one side thereof which are swung from centers substantially coincident with the pivot points aligned therewith, with the sprocket recesses receiving said raker link drive teeth being correspondingly contoured to provide for surface to surface contact between the teeth and the recesses, between the points at which the chain is reeled onto and unreeled from the sprocket, and the remaining sprocket recesses being angularly enlarged in relation to the angular width of the remaining drive teeth of the raker links which are received therein so that the latter drive teeth and recesses can smoothly engage and disengage with and from one another at the points in which the chain is reeled onto and unreeled from the sprocket.

4. A chain saw according to claim 3 wherein the cutter links are comprised of pairs of elongated cutter bits which are transversely interconnected in spaced parallel relationship to one another by spacer means which rest on the truncated edges of the sprocket teeth opposed thereto.

5. A chain saw according to claim 3 wherein the upper and lower edges of the guide bar are equipped with pairs of rails which form channels therealong at tangents to the sprocket, and wherein the drive teeth on the raker links are slidably guided in the channels and the bodies of the links are disposed substantially outside thereof.

References Cited by the Examiner
UNITED STATES PATENTS

| | | | |
|---|---|---|---|
| 593,714 | 11/1897 | Baldwin | 74—243 |
| 622,738 | 4/1899 | Voce et al. | 74—243 |
| 945,599 | 1/1910 | Purser | 143—135 |
| 3,124,179 | 3/1964 | Cavero | 143—135 |

FOREIGN PATENTS

| | | |
|---|---|---|
| 144,322 | 3/1954 | Sweden. |

DONALD R. SCHRAN, *Primary Examiner.*